Sept. 13, 1949.    H. HARRISON    2,481,660
FLUID DIAPHRAGM
Filed Nov. 7, 1946
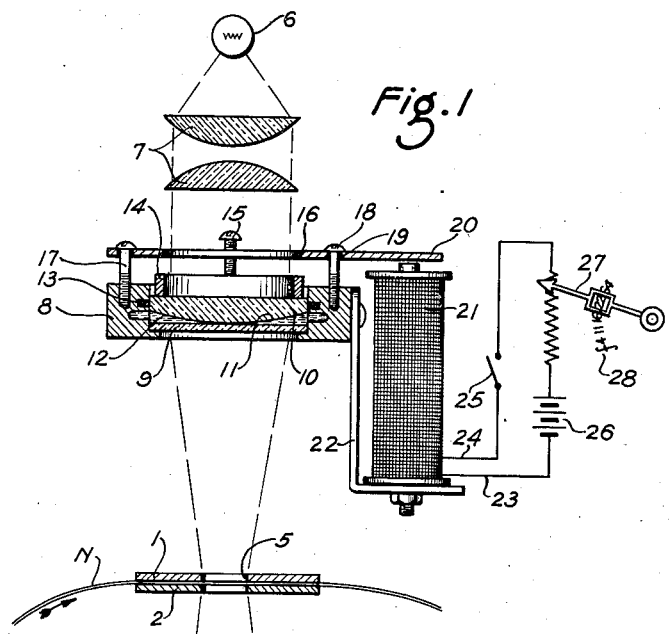
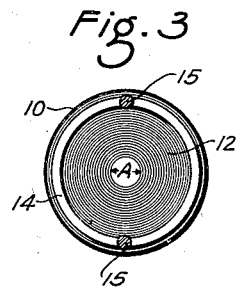
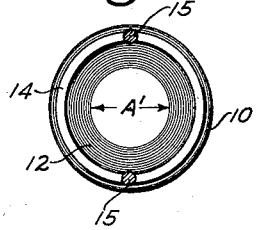
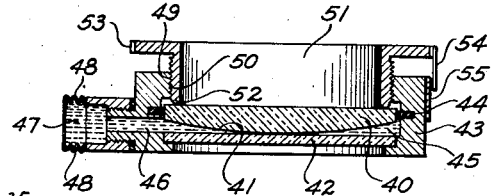
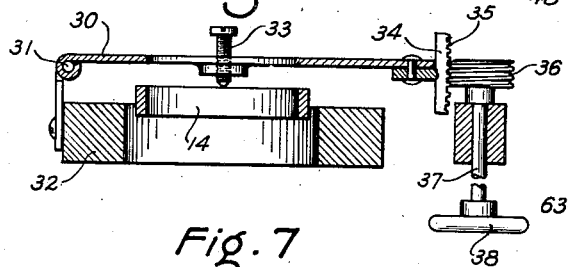
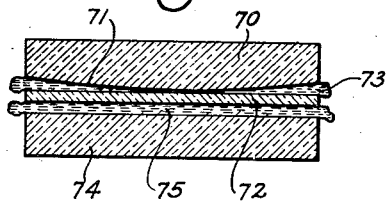
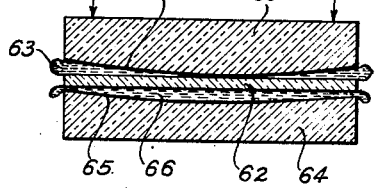
Henry Harrison
INVENTOR
BY
ATTORNEYS Patented Sept. 13, 1949

2,481,660

UNITED STATES PATENT OFFICE 2,481,660

FLUID DIAPHRAGM

Henry Harrison, Rochester, N. Y., assignor to Eastman Kodak Company, Rochester, N. Y., a corporation of New Jersey Application November 7, 1946, Serial No. 708,394

5 Claims. (Cl. 95—64)

This invention relates to photography and more particularly to diaphragms. One object of my invention is to provide a diaphragm for controlling a beam of light, the effective aperture of the diaphragm being controlled by pressure against optical elements between which there is a layer of fluid selected to obstruct light rays. Another object of my invention is to provide a fluid diaphragm which can be readily controlled to vary the diaphragm aperture and which can be readily operated by remote control. A still further object of my invention is to provide a fluid diaphragm which is particularly suitable for controlling a light beam passing through an optical system. A still further object of my invention is to provide a relatively inexpensive diaphragm which may control either certain colored light rays, or all of the light rays passing through optical apparatus, and other objects will appear from the following specification, the novel features being particularly pointed out in the claims at the end thereof.

It is customary to provide metal diaphragms consisting of plates with apertures in them, or consisting of two or more relatively movable plates or diaphragm leaves which can be manually moved to vary the size of an aperture through which light rays may pass. However, such diaphragms ordinarily have to be made with considerable care in order to operate properly. They are usually comparatively expensive and they are rather difficult to make, if either an extremely large or extremely small diaphragm is required. I have found that a comparatively inexpensive diaphram may be made by placing a layer of liquid of a color to obstruct light between two optical elements; one having a curved surface and the other having a flat surface, so that by applying pressure to the optical elements, the diaphragm liquid may be excluded from a larger or smaller area of an opening to in effect vary the size of a light beam passing through the optical elements.

Coming now to the drawings wherein like reference characters denote like parts throughout:

Fig. 1 is a schematic sectional view showing a liquid diaphragm constructed in accordance with and embodying a preferred form of my invention;

Fig. 2 is a fragmentary sectional view of a liquid diaphragm constructed in accordance with a second embodiment of my invention;

Fig. 3 is a schematic top plan view of a liquid diaphragm adjusted to a relatively small aperture;

Fig. 4 is a view similar to Fig. 3 with the diaphragm adjusted to a considerably larger aperture;

Fig. 5 is a fragmentary detail section showing another embodiment of my invention;

Fig. 6 is a fragmentary sectional view showing a method of correction which can be used in connection with a liquid diaphragm constructed in accordance with my invention; and Fig. 7 is a view similar to Fig. 6 but of still another correcting embodiment of my invention.

Broadly speaking, my invention consists in providing a diaphragm of a light-obstructing or an opaque liquid, which liquid fills a space between a curved surface optical element and a flat surface optical element. The curved surface may either be cylindrical or spherical, and it normally contacts with the flat optical element so that all the space between these two elements may be filled with the opaque liquid. Since the flat optical element is made comparatively thin and may flex by applying pressure to the rigid optical element, the cross section of the light-obstructing liquid is changed and it may be made to produce either a large or small aperture with comparatively slight changes in pressure between the two elements.

One embodiment of my invention is shown in Fig. 1 wherein a light beam is controlled; this beam being used, in the present instance, in a continuous printing machine. A negative N is passed through a film gate consisting of aperture plates 1 and 2 in the direction shown by the arrow preferably continuously moving, so that an objective O can form an image of the negative on a positive P passing through a gate consisting of the aperture plates 3 and 4. The films N and P are, of course, moved at uniform speed and continuously, and the light for the printing operation is directed to a slot 5 from a lamp 6, the light rays passing through condenser lenses 7.

In this instance my improved diaphragm may consist of a support 8, carrying a sheet of light-transparent material, such as glass 9, against which a lens 10 having a front curved surface 11 may rest; there being a layer 12 of fluid between these two optical members. The lens 10 may have a tight connection with the support 9 through a gasket 13. A ring 14 may be pressed downwardly by a pair of oppositely-disposed screws 15 passing through the ring-like member 16. This member may rock upon a screw 17 as a fulcrum, and a second screw 18 passes through the opening 19 in the arm 20 of this member.

Arm 20 forms an armature for the magnet 21 carried by a supporting bracket 22 and connected by wires 23 and 24 to a starting switch 25, a source of power 26, here shown as a battery, and a diaphragm-adjusting resistor 27. The adjusting arm may be arranged over a diaphragm scale 28, graduated into units of diaphragm values, so that an operator may, by adjusting the diaphragm-adjusting resistor 27, after having closed switch 25, create the desired amount of pressure on the ring 14 to cause the lens element to press against the optical flat and squeeze out the light-obstructing fluid to form an aperture of the desired diameter. For instance, Fig. 3 shows the aperture A to be of a small size as, for instance, f/22, and Fig. 4 shows the diaphragm A′ opened up to a predetermined extent such as to a predetermined value of f/4.

I have found that quite a large number of different materials are suitable for forming the light-obstructing liquid, and it is generally preferable to utilize a dye for this purpose. Many dyes will transmit only part of the spectrum and obstruct other rays and, under some circumstances, it may be desirable to change the color of the dye to various known types of filter dyes but, in general, I prefer to have the fluid which forms the diaphragm as nearly opaque as possible. It may happen that the smallest diameter of the diaphragm may transmit some small amount of light rays which affect sensitive film, but I have found that this is not particularly material.

Obviously, various ways may be used for creating the pressure between the optical elements as, for instance, in Fig. 2, the ring 14 may be compressed by a hinged member 30, mounted on the hinge pin 31 connected to a support 32 and carrying adjusting screws 33. One of these screws rests on each side of the ring 14 and this ring is connected to a rack 34 having teeth 35 meshing with the worm 36 carried by a shaft 37. This shaft may be adjusted by a handwheel 38. Both of these types of adjustments are useful in vertical machines where the diaphragm may be spaced some distance from the floor because obviously the operating members of these two systems—the diaphragm-adjusting resistor 27 of Fig. 1 or the handwheel 38 of Fig. 2—may be moved from a distant point.

Still another form of adjusting member is shown in Fig. 5 wherein a lens 40 has a curved surface 41 normally resting on the flat plate 42. Both these optical members are carried by the ring 43 and made fluid-tight as by means of a gasket 44 so as to hold a layer 45 of light-obstructing fluid between these optical elements. In this instance I provide a channel 46 to a reservoir 47 of the light-obstructing fluid; this reservoir having a flexible portion 48 to readily compensate for expansion and contraction. Member 43 is threaded at 49 to receive the thread 50 of the pressure ring 51. This ring has a flange 52 resting on the lens 40. In addition, it is provided with a knurled operating ring 53 and a pointer 54 which lies over a diaphragm scale 55. By turning the knurled ring 53, more or less pressure may be applied to the lens 40, thus flexing the plate 42 and causing the light-obstructing fluid 45 to move to or from the axis of the optical element, thus effectively changing the diameter of the diaphragm.

I have found that where the curved surface of the lens is a spherical surface, or an aspherical one for that matter, the light-obstructing liquid will maintain a circular shape, so that the effective aperture of a fluid diaphragm is always substantially round. If I should desire to use a cylindrical lens, the diaphragm, of course, would be rectangular according to the shape of the cylindrical lens which would, of course, deflect the optical flat in one direction only. For most purposes, however, I prefer to provide a spherical or aspherical surface on the lens element.

For many purposes, as for instance for the printer shown diagrammatically in Fig. 1, the fact that the optical elements have some power is not important. As a matter of fact, I have found that very little power is necessary as the lens may be of one-fourth or one-half diopter, although this, of course, may vary in accordance with the purpose for which the device is used. If, however, it should be undesirable to have power in the liquid diaphragm, this can be overcome by providing a second liquid layer. Referring to Fig. 6, the lens member 60 has a cylindrical surface 61 which normally touches the upper surface of the plain glass plate 62; there being a layer of light-obstructing fluid 63 between the remaining portions of these two optical elements. Each time pressure is applied in the direction shown by the arrows to the lens 60, the plate 62 is deflected and the cross-sectional shape of the liquid diaphragm is altered. I can provide a second lens element 64 having a curved surface 65, and I may place a liquid layer 66 between this element and the glass flat. I prefer generally to provide this liquid layer of a clear, or light-transmitting liquid, and usually it is desirable to make it the same liquid that is used as a solvent for the dye light-obstructing fluid. For instance, if the light-obstructing layer 63 is of a dye dissolved in acetone, then acetone may be conveniently used for the clear layer of liquid 66 without the dye being added. By the proper selection of refractive index of the third optical element 64 and of the liquid layer 66, the power which otherwise might exist in the optical element can be eliminated. In another embodiment of my invention, shown in Fig. 7, lens 70 has a spherical surface 71 resting against the upper surface of a second optical member 72 which is a flat, there being a layer of light-obstructing fluid 73 between the first and second optical elements. Here, the third optical element 74 may also by a glass flat and the layer 75 of liquid between the second and third optical elements is a light-transmitting liquid. Thus, if pressure is applied to the lens 70, deflecting the glass plate 72 to alter the cross section of the light-obstructing liquid layer 73 and thereby the effective diameter of the diaphragm, the transparent or light-transmitting layer 75 of liquid between the second and third optical elements is also altered in cross section by a like amount. Here again, by properly selecting the refractive indices of the optical elements and the transparent liquid layer, any power of the two optical elements 70 and 72 may be offset. This is desirable if a liquid diaphragm is to be used in an objective because if there were power in the diaphragm optical elements themselves, they would spoil the corrections of the objective.

In any of the embodiments of my invention I, of course, provide some form of expansion chamber for the liquid layers, both the light-obstructing liquid and the light-transmitting liquid layers, so that the material does not dry out and so that it may expand and contract under the pressure applied to the lens which forms the first optical element of the diaphragm. It is, of course, necessary that one of the optical elements of the diaphragm is comparatively rigid and that one may flex. I prefer to have the rigid member the member having power and the flexible member the glass flat because this appears to produce the most desirable results.

As pointed out above, I usually prefer to provide a diaphragming liquid which is as nearly opaque as can be obtained for general purposes, although with some types of materials it is quite possible that dyes which are only partially opaque to the spectrum might serve just as satisfactorily, particularly as certain types of photographic material are color blind through certain ranges of the spectrum. It will readily occur to one skilled in the art to provide a liquid diaphragm of a dye which will mask off the light rays to which the film may be sensitive to the desired degree, so that by adjusting the liquid diaphragm to a known value, exactly the same amount of light may be passed each time the diaphragm is so set.

Having thus described my invention what I claim is new and desire to secure by Letters Patent of the United States is:

1. An optical diaphragm comprising a pair of light-transmitting members, one having a flat flexible surface facing the other and the other having a spherically-curved surface normally contacting the flat surface of the first-mentioned member, a layer of light-obstructing fluid between the curved and flat surfaces forming a diaphragm, and means to vary the pressure between the contacting curved and flat surfaces to flex the flat surface and to vary the shape of the light-obstructing fluid forming the diaphragm, a third light-transmitting member adjacent to, but spaced from, the flat light-transmitting member and a layer of liquid between, adapted to change in shape when pressure is applied to the curved and flat surfaces to flex the flat surface and to alter the diaphragm shape, said layer of liquid last referred to optically compensating for the power of the system.

2. An optical diaphragm comprising a first light-transmitting member having a curved surface, a second light-transmitting member comprising an optical flat adapted to flex under pressure, a layer of light-obstructing fluid therebetween, a third light-transmitting member spaced from the second, a layer of light-transmitting fluid between the second and third members constituting a variable power fluid lens, and means for flexing the second light-transmitting optical flat member from its optically flat position, thereby altering the shape of both the light-obstructing and light-transmitting fluid layers as the light-obstructing fluid layer changes to alter the effective diaphragm opening due to flexing of the optical flat from its normal flat condition.

3. An optical diaphragm as defined in claim 2 characterized by the light-obstructing fluid comprising a dye in a solvent.

4. An optical diaphragm as defined in claim 2 characterized by the light-obstructing fluid comprising a dye in a solvent, the light-transmitting fluid comprising the same solvent but without a dye.

5. An optical diaphragm comprising a lens having a convex surface and a sheet of flexible transparent material, means for mounting the sheet of flexible transparent material, a mount for the lens positioned to hold the convex surface of the lens in contact with the sheet of flexible transparent material, and a light-obstructing fluid filling the space between the lens and sheet forming a diaphragm thicker at the edges than at the center thereof in cross section, and means for pressing the lens and sheet together to flex the transparent sheet material to vary the effective size of the diaphragm by changing the cross section of the light-obstructing fluid.

HENRY HARRISON.

REFERENCES CITED

The following references are of record in the file of this patent:

UNITED STATES PATENTS

| Number | Name | Date |
|---|---|---|
| 1,515,389 | Hopkins | Nov. 11, 1924 |
| 1,763,220 | Chromy | June 10, 1930 |